United States Patent
Takizawa et al.

(10) Patent No.: US 12,313,960 B2
(45) Date of Patent: May 27, 2025

(54) MOUNTING MEMBER AND PROJECTION OPTICAL APPARATUS

(71) Applicant: SEIKO EPSON CORPORATION, Tokyo (JP)

(72) Inventors: Takahiro Takizawa, Suzaka (JP); Naoto Takehana, Azumino (JP); Hirofumi Okubo, Matsumoto (JP); Takeshi Hirai, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 692 days.

(21) Appl. No.: 17/523,983

(22) Filed: Nov. 11, 2021

(65) Prior Publication Data

US 2022/0155550 A1 May 19, 2022

(30) Foreign Application Priority Data

Nov. 13, 2020 (JP) ................................. 2020-189262

(51) Int. Cl.
*G03B 17/56* (2021.01)
*G03B 21/14* (2006.01)

(52) U.S. Cl.
CPC ......... *G03B 17/561* (2013.01); *G03B 21/145* (2013.01)

(58) Field of Classification Search
CPC .... G03B 17/561; G03B 21/145; G03B 21/16; G03B 21/2066; G03B 21/2073; G03B 21/28
USPC ......................................................... 353/119
See application file for complete search history.

(56) References Cited

U.S. PATENT DOCUMENTS

| | | | |
|---|---|---|---|
| 9,961,318 B2 | 5/2018 | Ichieda et al. | |
| 2005/0068501 A1 | 3/2005 | Nonaka et al. | |
| 2010/0066986 A1* | 3/2010 | Lin | G03B 21/142 353/101 |
| 2017/0208307 A1* | 7/2017 | Ichieda | H04N 9/3185 |
| 2018/0217477 A1* | 8/2018 | Kurota | G03B 21/145 |
| 2019/0302577 A1* | 10/2019 | Elias | G03B 17/561 |
| 2020/0292924 A1* | 9/2020 | Amano | H04N 9/3185 |
| 2021/0165309 A1* | 6/2021 | Kubota | G03B 21/208 |
| 2021/0286241 A1* | 9/2021 | Masuzawa | G03B 21/147 |

FOREIGN PATENT DOCUMENTS

| | | | | |
|---|---|---|---|---|
| CN | 113406847 A | * | 9/2021 | ............ G03B 17/54 |
| JP | 2005-109916 A | | 4/2005 | |
| JP | 2007-072378 A | | 3/2007 | |
| JP | 2012155326 A | * | 8/2012 | ............ G03B 21/14 |
| JP | 2017-129839 | | 7/2017 | |
| JP | 2019-002969 | | 1/2019 | |
| JP | 2020-046678 | | 3/2020 | |

\* cited by examiner

*Primary Examiner* — Magda Cruz
(74) *Attorney, Agent, or Firm* — Dority & Manning, P.A.

(57) ABSTRACT

A mounting member mounts an imaging apparatus on a projection optical apparatus that projects image light. The mounting member includes a first plate part to which the imaging apparatus is fixed, the first plate part having a shape of a planar plate, and a second plate part having a shape of a planar plate and extending from the first plate part, the second plate part being fixed to the projection optical apparatus. The first plate part has a first surface and a second surface opposite from the first surface. The second plate part is disposed on the side facing the second surface. The first surface is a placement surface where the imaging apparatus is placed.

11 Claims, 11 Drawing Sheets

MOUNTING MEMBER AND PROJECTION OPTICAL APPARATUS

The present application is based on, and claims priority from JP Application Serial Number 2020-189262, filed Nov. 13, 2020, the disclosure of which is hereby incorporated by reference herein in its entirety

BACKGROUND

1. Technical Field

The present disclosure relates to a mounting member and a projection optical apparatus.

2. Related Art

There has been a known projector that modulates the light outputted from a light source and projects the modulated light via a projection optical apparatus (see JP-A-2017-129839 and JP-A-2020-46678, for example).

The projector described in JP-A-2017-129839 includes a first camera, a second camera, and an adjuster. The first camera is a camera that captures an image of an image projected on a projection receiving surface when a first projection lens for long distance projection is attached to the projector. The second camera captures an image of an image of an image projected on the projection receiving surface when a second projection lens for short distance projection is attached to the projector. The first camera and the second camera are built in the projector. The adjuster adjusts the image projected on the projection receiving surface based on the image captured by the first or second camera. For example, the adjuster performs keystone correction that is correction of trapezoidal distortion of the projected image and correction of the colors of the projected image.

The projector described in JP-A-2020-46678 includes an image forming panel and a projection optical system that enlarges an image displayed on the image forming panel and projects the enlarged image. The projection optical system includes a first optical system having a first optical axis, a first mirror, a second optical system having a second optical axis, a second mirror, and a third optical system having a third optical axis, and a lens barrel. The lens barrel includes a first holding barrel to which the first optical system and first mirror are fixed, a second holding barrel to which the second optical system and second mirror are fixed, a third holding barrel to which the third optical system is fixed, and first and second linkage sections. The first linkage section links the first holding barrel to the second holding barrel in a pivotable manner around the second optical axis, and the second linkage section links the second holding barrel to the third holding barrel in a pivotable manner around the third optical axis.

The image displayed on the image forming panel travels via the third optical system, is reflected off the second mirror, and passes through the second optical system. The image having passed through the second optical system is reflected off the first mirror and then projected by the first optical system. In this process, the direction in which the projection optical system projects an image is changed when the first and second linkage sections cause pivotal motion of at least one of the first and second holding barrels.

Since the first and second cameras described in JP-A-2017-129839 are provided at the front panel of the projector, the imaging direction of each of the cameras is fixed. In an attempt to incorporate the projected image adjustment function using the cameras described in JP-A-2017-129839 into the projector described in JP-A-2020-46678, the cameras undesirably cannot capture images of the projected image because the projection optical system described in JP-A-2020-46678 projects the image in the direction opposite to the direction in which the image from the image forming panel is incident. Furthermore, when the projector has a configuration that allows replacement of the projection optical apparatus, it is likely that an image projected by the replaced projection optical apparatus does not fall within the imaging areas of the cameras.

SUMMARY

A mounting member mounts an imaging apparatus on a projection optical apparatus that projects image light. The mounting member includes a first plate part to which the imaging apparatus is fixed, the first plate part having a shape of a planar plate, and a second plate part having a shape of a planar plate and extending from the first plate part, the second plate part being fixed to the projection optical apparatus. The first plate part has a first surface and a second surface opposite from the first surface. The second plate part is disposed on a side facing the second surface. The first surface is a placement surface where the imaging apparatus is placed.

A projection optical apparatus projects image light. The projection optical apparatus includes a fixing part fixing a mounting member that mounts an imaging apparatus on the projection optical apparatus, the imaging apparatus being configured to capture an image of a projection area where the image light is projected by the projection optical apparatus.

DESCRIPTION OF EXEMPLARY EMBODIMENTS

An embodiment of the present disclosure will be described below with reference to the drawings.

Schematic Configuration of Projector

Figure 1:
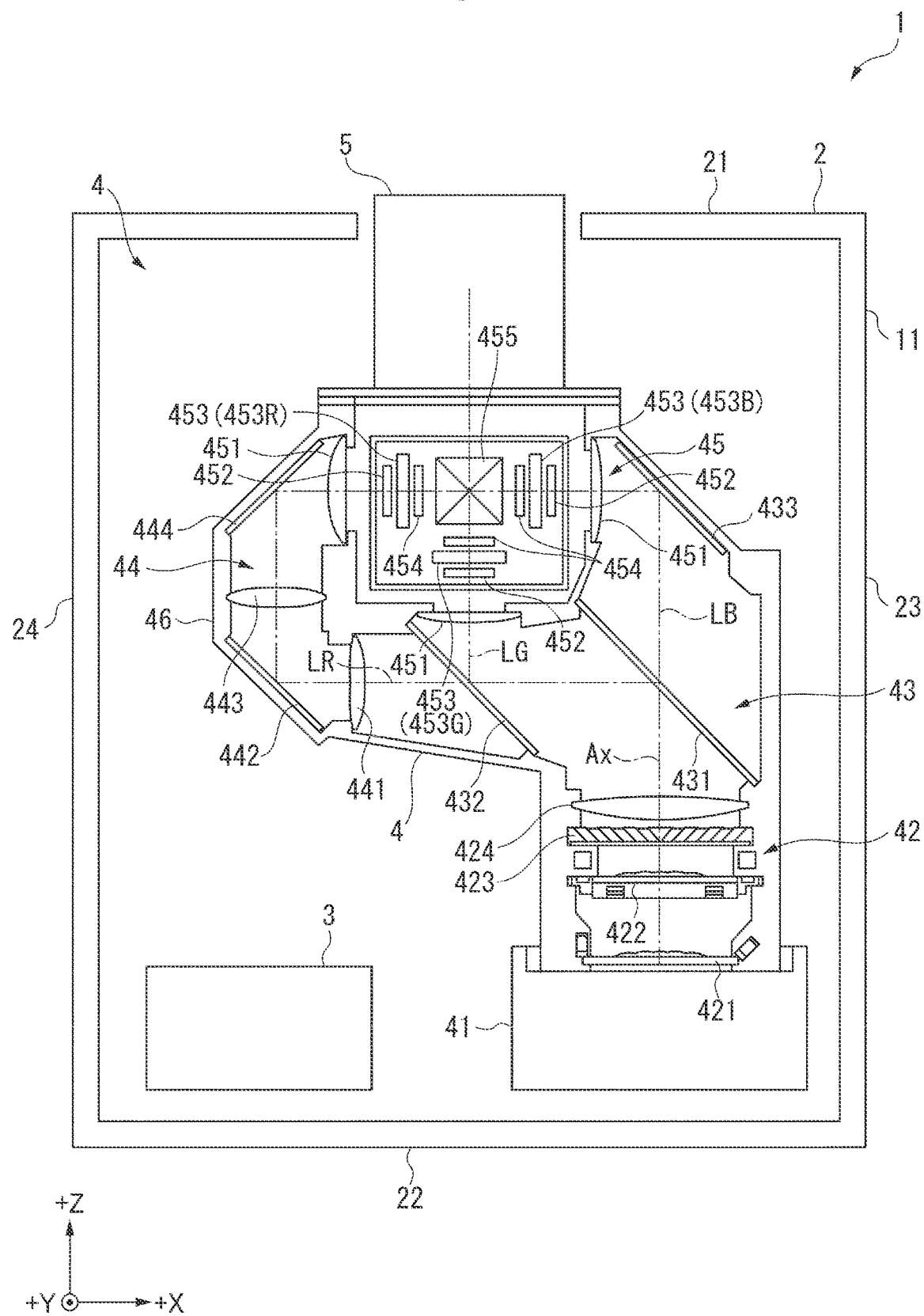
FIG. 1 is a diagrammatic view showing the configuration of a projector according to an embodiment.

FIG. 1 is a diagrammatic view showing the configuration of a projector 1 according to the present embodiment.

The projector 1 according to the present embodiment modulates light outputted from a light source 41 in accordance with image information, enlarges the modulated light, and projects the enlarged light on a projection receiving surface, such as a screen. The projector 1 includes a main body 11 and a projection optical apparatus 5, which is attachable to and detachable from the main body 11, as shown in FIG. 1. Although not shown in FIG. 1, an imaging apparatus 6 (see FIGS. 4 and 5) can be mounted on the projection optical apparatus 5 via a mounting member 7. The imaging apparatus 6 and the mounting member 7 will be described later in detail.

The main body 11 includes an exterior enclosure 2, and a controller 3 and an image generator 4 accommodated in the exterior enclosure 2. In addition to the above, the main body 11 includes, although not shown, an attachment and detachment mechanism that attaches and detaches the projection optical apparatus 5, a power supply that supplies electronic parts that form the projector 1 with electric power, and a cooler that cools cooling targets that form the projector 1.

Configuration of Exterior Enclosure

The exterior enclosure 2 has a front surface 21, a rear surface 22, a left side surface 23, and a right side surface 24, further has a top surface 25 and a bottom surface 26 (see FIG. 2), which are not shown in FIG. 1, and is formed in a substantially box-like shape. The exterior enclosure 2 is provided with, although not shown, an operation panel coupled to the controller, a light receiver, and a connection terminal.

Configuration of Controller

The controller 3 includes an arithmetic processor, such as a CPU (central processing unit), and controls the projector 1. For example, the controller 3 operates the projector 1 based on an operation signal inputted from the operation panel and an operation signal outputted from a remote control and received by the light receiver. The controller 3 adjusts an image projected on the projection receiving surface by the projection optical apparatus 5 based on a captured image inputted from the imaging apparatus 6 coupled to the connection terminal. For example, the controller 3 performs adjustment, such as keystone correction that is correction of trapezoidal distortion of the projected image and correction of the colors of the projected image, based on the image captured by the imaging apparatus 6.

Configuration of Image Generator

The image generator 4 generates image light according to image information (including image signal) inputted from the controller 3 and outputs the generated image light to the projection optical apparatus 5. The image generator 4 includes the light source 41, a homogenizer 42, a color separator 43, a relay apparatus 44, an image formation apparatus 45, and an optical part enclosure 46.

The light source 41 outputs illumination light to the homogenizer 42. The configuration of the light source 41 may, for example, include a solid-state light source that outputs blue light that is excitation light and a wavelength converter that converts in terms of wavelength part of the blue light outputted from the solid-state light source into fluorescence containing green light and red light. The configuration of the light source 41 may instead include a light source lamp, such as an ultrahigh pressure mercury lamp, and may still instead include solid light sources that individually output blue light, green light, and red light.

The homogenizer 42 homogenizes the illuminance of the light flux incident from the light source 41. The homogenizer 42 includes a first lens array 421, a second lens array 422, a polarization converter 423, and a superimposing lens 424.

The color separator 43 separates the light flux incident from the homogenizer 42 into red light LR, green light LG, and blue light LB. The color separator 43 includes dichroic mirrors 431 and 432 and a reflection mirror 433.

The relay apparatus 44 is provided in the optical path of the red light LR, which is longer than the optical paths of the blue light LB and the green light LG, and suppresses loss of the red light LR. The relay apparatus 44 includes a light-incident-side lens 441, a reflection mirror 442, a relay lens 443, and a reflection mirror 444. Instead, the blue light LB is set to have a longer optical path than the other color light, and the relay apparatus 44 may be provided in the optical path of the blue light LB.

The image formation apparatus 45 modulates the blue light LB, the green light LG, and the red light LR incident thereon and combines the modulated blue light LB, green light LG, and red light LR with one another to form image light. The image formation apparatus 45 includes field lenses 451, light-incident-side polarizers 452, light modulators 453, and light-exiting-side polarizers 454, which are provided for the respective color light LB, LG and LR, and further includes one light combiner 455.

The light modulators 453 modulate the light outputted from the light source 41 in accordance with image information. The light modulators 453 include a blue light modulator 453B, which modulates the blue light LB, a green light modulator 453G, which modulates the green light LG, and a red light modulator 453R, which modulates the red light LR. In the present embodiment, the light modulators 453 are each formed of a transmissive liquid crystal panel, and the light-incident-side polarizers 452, the light modulators 453, and the light-exiting-side polarizers 454 form liquid crystal light valves.

The light combiner 455 combines the color light modulated by the light modulator 453B, the color light modulated by the light modulator 453G, and the color light modulated by the light modulator 453R with one another to form image light. The light combiner 455 outputs the formed image light to the projection optical apparatus 5. The light combiner 455 is formed of a cross dichroic prism, but not necessarily, and can instead be formed, for example, of a plurality of dichroic mirrors.

The optical part enclosure 46 holds the apparatuses 42 to 44 and the field lenses 451 described above. An illumination optical axis Ax, which is the optical axis in the design stage, is set in the image generator 4, and the optical part enclosure 46 holds the apparatuses 42 to 44 and the field lenses 451 described above in predetermined positions on the illumination optical axis Ax. The light source 41, the image formation apparatus 45, and the projection optical apparatus 5 are disposed in predetermined positions on the illumination optical axis Ax.

In the following description, three directions perpendicular to one another are called directions +X, +Y, and +Z. The direction +Z is the direction from the rear surface 22 toward the front surface 21, which is the direction in which the image generator 4 outputs the image light, and the direction +Y is the direction from the bottom surface 26 toward the top surface 25. The direction +X is the leftward direction when the projector 1 is viewed in the direction +Z with the direction +Y oriented upward.

The direction opposite to the direction +X is a direction −X, the direction opposite to the direction +Y is a direction −Y, and the direction opposite to the direction +Z is a direction −Z.

The term "perpendicular" refers to intersecting at right angles.

Configuration of Projection Optical Apparatus

The projection optical apparatus 5 is used in the projector 1 and projects the image light. In detail, the projection optical apparatus 5 projects the image light incident from the light combiner 455 onto the projection receiving surface to display an image on the projection receiving surface. The projection optical apparatus 5 includes an optical system having a horizontally U-letter-shaped optical path, deflects in two successive stages the direction of the image light outputted from the light combiner 455, and projects the image light onto the projection receiving surface located on the opposite side from the side toward which the light combiner 455 outputs the image light, as shown in FIG. 2.

Figure 2:
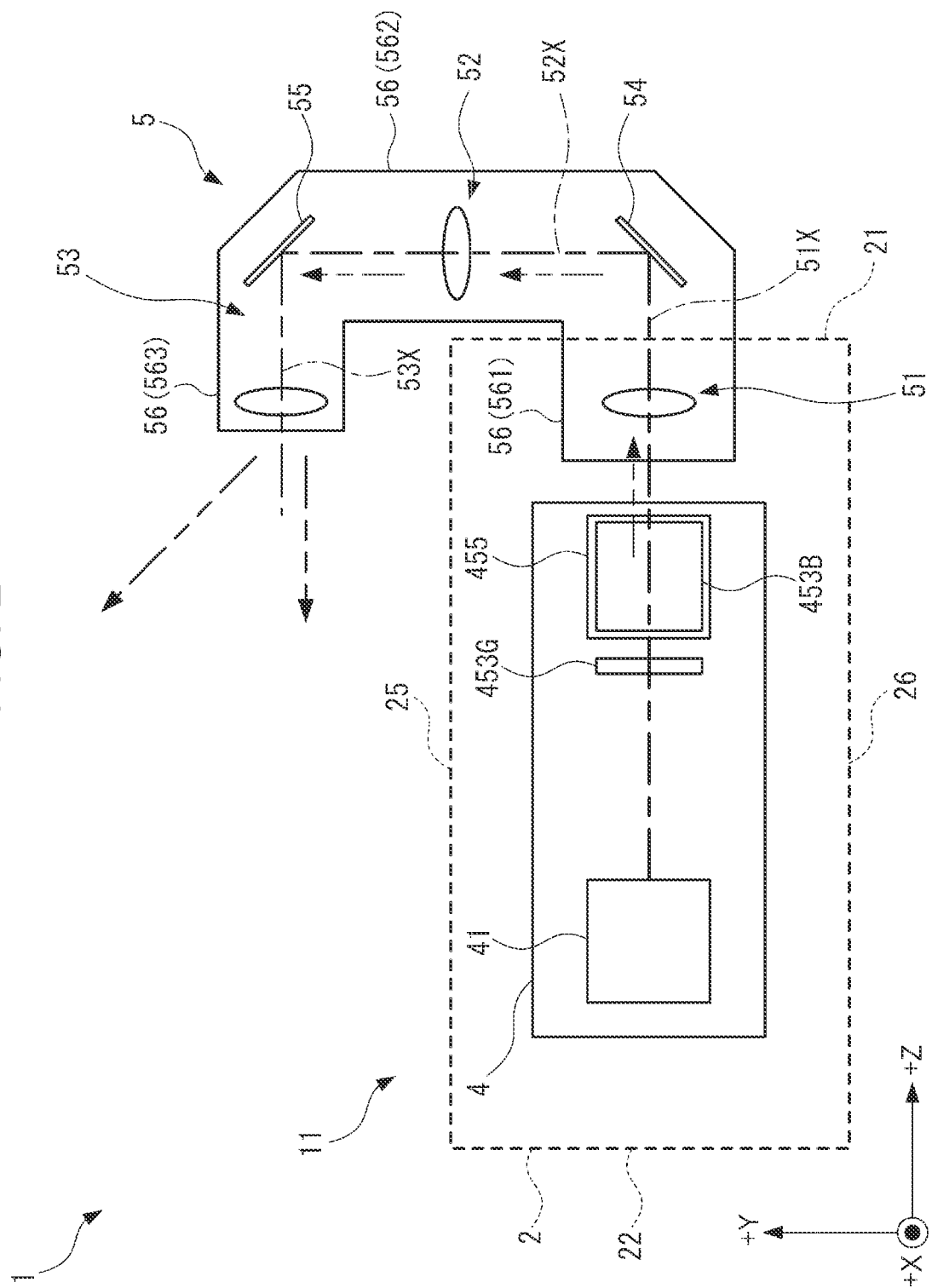
FIG. 2 is a side view of the projector according to the embodiment viewed from the side facing the left side surface of the projector.
Figure 3:
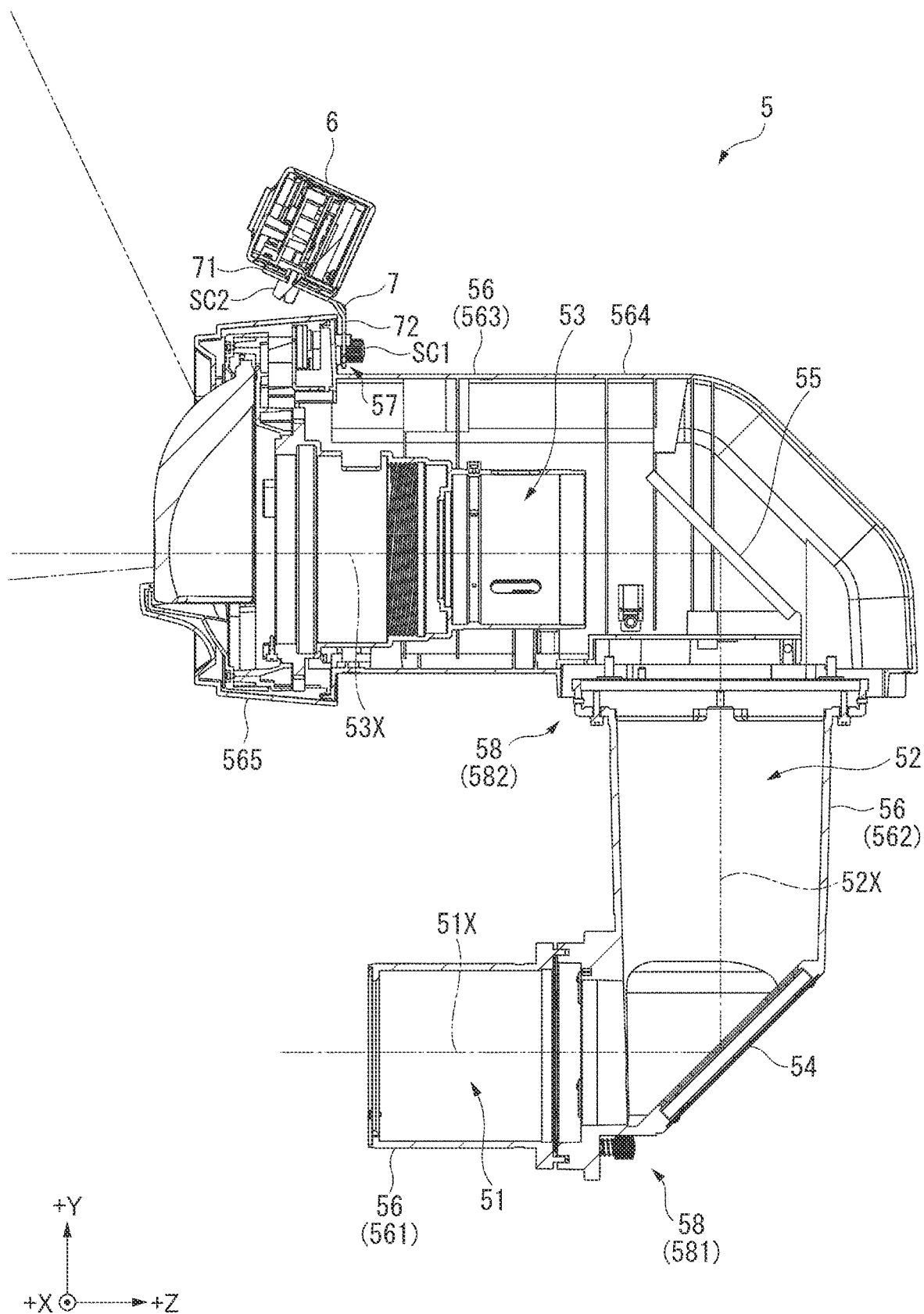
FIG. 3 is a cross-sectional view showing a projection optical apparatus according to the embodiment.

FIG. 2 is a side view of the projector 1 viewed from the side facing the left side surface 23. FIG. 2 diagrammatically shows a first lens group 51, a second lens group 52, and a third lens group 53, which form the projection optical apparatus 5, in the form of a single lens. FIG. 3 is a cross-sectional view showing the projection optical apparatus 5 taken along the plane YZ. In FIG. 3, some of the lenses that form the projection optical apparatus 5 are omitted.

The projection optical apparatus 5 includes the first lens group 51, the second lens group 52, and the third lens group 53, as shown in FIG. 2, and further includes a first mirror 54, a second mirror 55, a lens barrel 56, a fixing part 57, and a projection direction changing mechanism 58, as shown in FIGS. 2 and 3. That is, the projection optical apparatus 5 includes a plurality of lenses.

Configuration of First Lens Group and First Mirror

The first lens group 51 and the second lens group 52 form an intermediate image.

The image light from the image generator 4 enters the first lens group 51. An optical axis 51X of the first lens group 51 extends along the direction +Z. The image light outputted from the image generator 4 passes through the first lens group 51 along the direction +Z and travels to the first mirror 54.

The first mirror 54 is disposed between the first lens group 51 and the second lens group 52. The first mirror 54 reflects the image light having passed through the first lens group 51, and the reflected image light travels in the direction +Y, where the second lens group 52 is disposed. The first lens group 51 is disposed on the reduction side of the first mirror 54, and the second lens group 52 is disposed on the enlargement side of the first mirror 54.

Configuration of Second Lens Group and Second Mirror

The second lens group 52 has an optical axis 52X, which intersects with the optical axis 51X of the first lens group 51. The optical axis 52X of the second lens group 52 extends along the direction +Y. The image light reflected off the first mirror 54 passes through the second lens group 52 along the direction +Y and travels to the second mirror 55. In the present embodiment, the optical axis 52X is perpendicular to the optical axis 51X.

The second mirror 55 is disposed between the second lens group 52 and the third lens group 53 and reflects in the direction −Z the image light having passed through the second lens group 52 and incident on the second mirror 55 in the direction +Y to cause the image light to enter the third lens group 53.

Configuration of Third Lens Group

Figure 4:
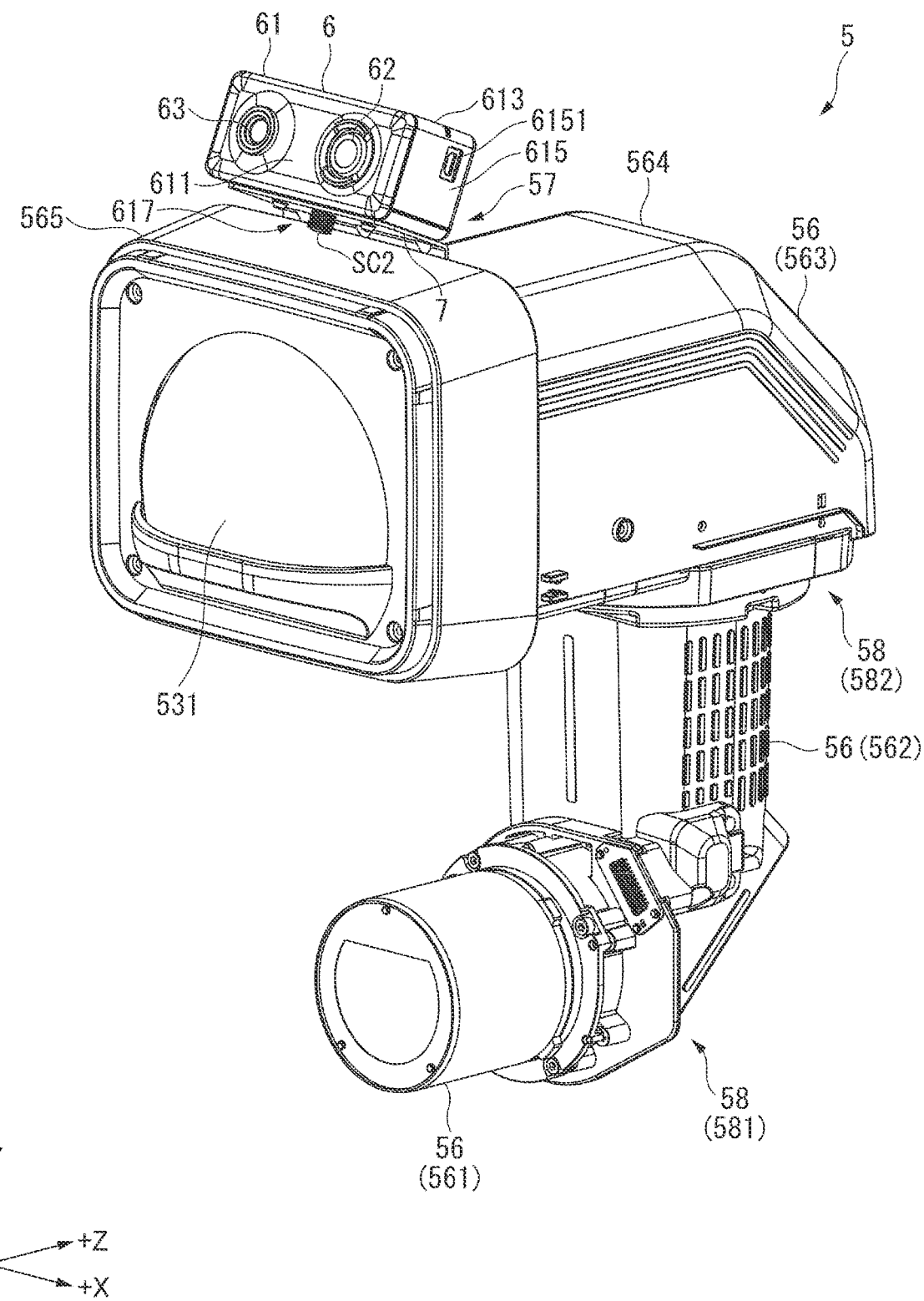
FIG. 4 is a perspective view showing the projection optical apparatus according to the embodiment.

FIG. 4 is a perspective view of the projection optical system 5 viewed in the directions +Z and +Y.

The third lens group 53 magnifies the intermediate image. The third lens group 53 has an optical axis 53X, which intersects with the optical axis 52X of the second lens group 52 and extends along the direction −Z. The image light reflected off the second mirror 55 passes through the third lens group 53 along the direction −Z and is projected toward the projection receiving surface. In the present embodiment, the optical axis 53X is perpendicular to the optical axis 52X. The optical axis 53X and the optical axis 51X are therefore parallel to each other.

The third lens group 53 includes a projection lens 531 in a position on the side toward which the image light having passed through the third lens group 53 exits, as shown in FIG. 4. The projection lens 531 is the largest lens in the third lens group 53 and is a lens that finally projects the image light onto the projection receiving surface located in a position outside the projection optical apparatus 5. That is, the projection lens 531 is a lens located in a position closest to the enlargement side out of the plurality of lenses. In the present embodiment, the angle of view of the projection lens 531 viewed in the direction +X is 70°. The optical axis of the projection lens 531 coincides with the optical axis 53X.

The third lens group 53 includes a focusing lens, although not shown. The focusing lens is moved by a focus adjuster that is not shown in the direction +Z or −Z along the optical axis 53X. Focus adjustment is thus so made that a focused image is displayed on the projection receiving surface. The configuration of the focus adjuster may, for example, include a motor controlled by the controller 3 and a wheel train mechanism including gears and other components, or the wheel train mechanism may be manually operated by a user.

The image light reflected off the second mirror 55 in the direction −Z is angularly widened by the third lens group 53 and travels in a direction that inclines in the direction +Y with respect to the optical axis 53X. Therefore, the projection optical apparatus 5 is capable of enlarging projection in a position close to the projection receiving surface, and the projector 1 to which the projection optical apparatus 5 is attached functions as a short-focal-length projector.

Configuration of Lens Barrel

Figure 5:
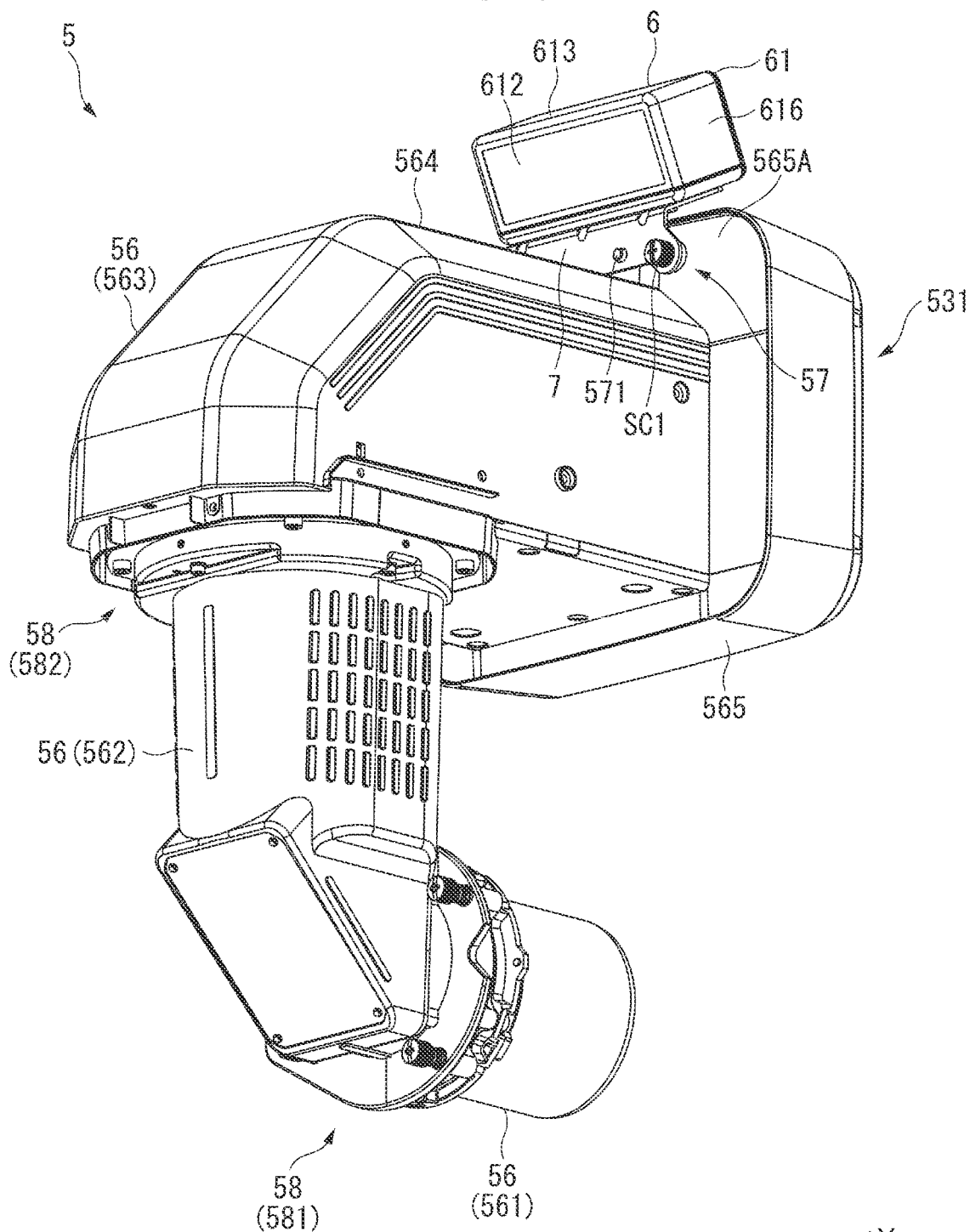
FIG. 5 is a perspective view showing the projection optical apparatus according to the embodiment.

FIG. 5 is a perspective view of the projection optical apparatus 5 viewed in the directions −Z and −Y.

The lens barrel 56 accommodates the first lens group 51, the second lens group 52, the third lens group 53, the first mirror 54, and the second mirror 55, as shown in FIGS. 3 to 5. That is, the lens barrel 56 holds a plurality of lenses. The lens barrel 56 includes a first holding member 561, a second holding member 562, and a third holding member 563.

The first holding member 561 is mounted on the main body 11 in an attachable and detachable manner and holds the first lens group 51.

The second holding member 562 holds the second lens group 52 and the first mirror 54.

The third holding member 563 holds the third lens group 53 and the second mirror 55.

The third holding member 563 includes a main body 564, which holds the lenses excluding the projection lens 531 in the third lens group 53, and a projection part 565, which is located in a position shifted in the direction −Z, which is the direction in which the image light is projected with respect to the main body 564, as shown in FIG. 3.

The projection part 565 holds the projection lens 531 and outputs the image light to project an image onto the projection receiving surface, as shown in FIGS. 3 and 4.

The projection lens 531, which is the rear-side lens via which the image light exits in the projection optical apparatus 5, is the largest lens in the third lens group 53, which magnifies the image light, and is also the largest lens among the lenses provided in the projection optical apparatus 5. To hold the projection lens 531, the projection part 565 protrudes in the directions ±X and ±Y with respect to the main body 564 and therefore has a diameter wider than that of the main body 564. That is, the projection part 565 extends outward from the main body 564. The projection part 565 has a fixing surface 565A, which intersects with the optical axis 53X (see FIG. 2), which coincides with the optical axis of the projection lens 531, in the direction +Z and faces in the direction opposite to the direction in which the image light is projected. The fixing surface 565A is a surface to which the mounting member 7 can be fixed.

Configuration of Fixing Part

Figure 6:
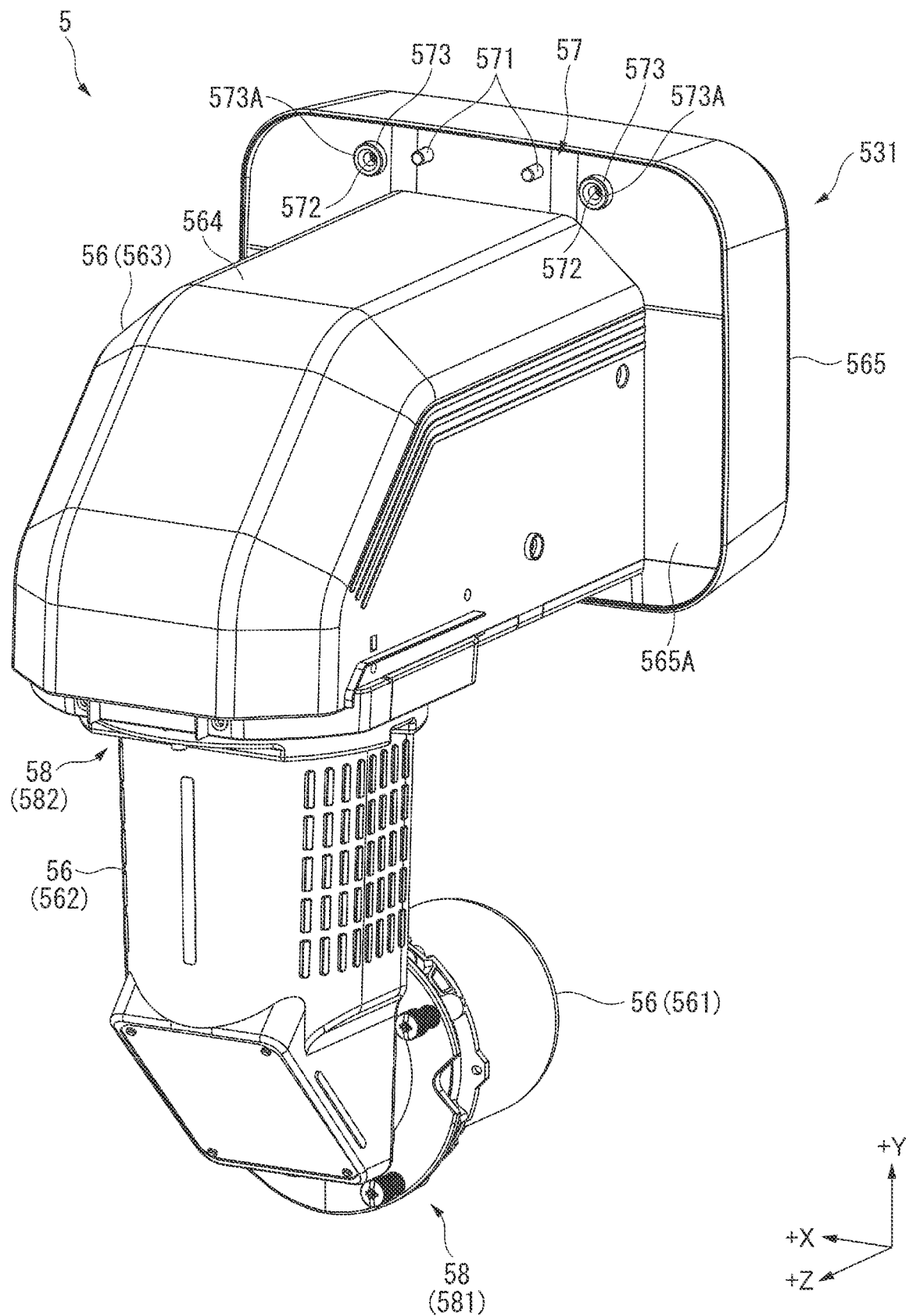
FIG. 6 is a perspective view showing a projection part and a fixing part in the projection optical apparatus according to the embodiment.
Figure 7:
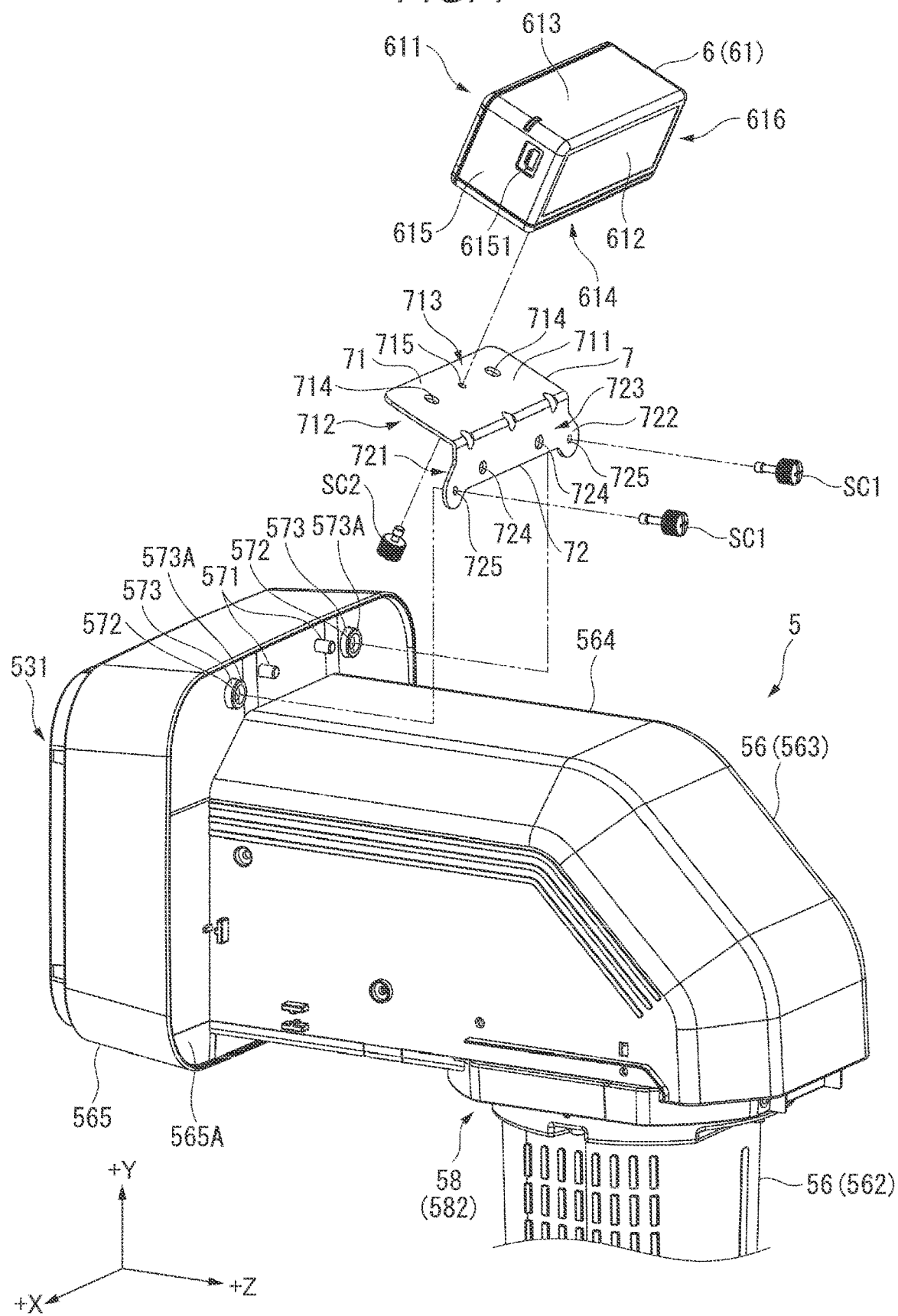
FIG. 7 is a perspective view showing the state in which the projection optical apparatus, an imaging apparatus, and a mounting member according to the embodiment are separate from each other.

FIG. 6 is a perspective view showing the fixing part 57 in the projection optical apparatus 5. FIG. 7 is a perspective view viewed in the direction +Z and showing the state in which the projection optical apparatus 5, the imaging apparatus 6, and the mounting member 7 are separated from each other.

The fixing part 57 is a portion to which the mounting member 7, which attaches the imaging apparatus 6 to the projection optical apparatus 5, is fixed and is provided in a +Y-direction-side area of the fixing surface 565A of the projection part 565. That is, the projection optical apparatus 5 includes the fixing part 57, to which the mounting member 7 is fixed. In the present embodiment, the fixing part 57 is provided at the projection part 565, more specifically, at the fixing surface 565A of the projection part 565. The fixing part 57 has positioners 571 and holes 572, as shown in FIGS. 6 and 7.

The positioners 571 correspond to a projection-optical-apparatus-side positioner. The positioners 571 position the mounting member 7 at the fixing surface 565A. In the present embodiment, the fixing part 57 includes two positioners 571, which are inserted into positioners 724 of the mounting member 7. That is, the positioners 571 are positioning pins that are inserted into the positioners 724 of the mounting member 7 to position the mounting member 7.

The holes 572 correspond to a projection-optical-apparatus-side hole. The holes 572 are holes into which fixing members that fix the mounting member 7 to the fixing surface 565A are inserted. In detail, the holes 572 are formed in bosses 573 provided at the fixing surface 565A. In the present embodiment, two holes 572 are provided in the fixing part 57. The holes 572 are screw holes into which screws SC1 as the fixing members are inserted. When the mounting member 7 is fixed to the thus configured fixing part 57, +Z-direction-side surfaces 573A of the bosses 573 and a first surface 721 of the mounting member 7 come into surface contact with each other. The surfaces 573A form part of the fixing surface 565A and intersect with the optical axis of the projection lens 531. It can be said that the screws SC1 are a fixing member for the mounting member.

Configuration of Projection Direction Changing Mechanism

The projection direction changing mechanism 58 changes the direction in which the image light is projected via the projection lens 531 of the projection part 565. The projection direction changing mechanism 58 includes a first linkage part 581 and a second linkage part 582.

The first linkage part 581 links the first holding member 561 with the second holding member 562 in such a way that the second holding member 562 is rotatable around the optical axis 51X of the first lens group 51.

The second linkage part 582 links the second holding member 562 with the third holding member 563 in such a way that the third holding member 563 is rotatable around the optical axis 52X of the second lens group 52.

The second holding member 562 is thus pivotable around the optical axis 51X of the first lens group 51 along the direction +Z. The third holding member 563, which holds the projection lens 531, which projects the image light, is pivotable around the optical axis 52X of the second lens group 52 along the direction +Y. The projection optical apparatus 5 is therefore not only capable of projecting the image light in the direction −Z but capable of projecting the image light in the user's desired direction among the directions +Z, +X, −X, +Y and −Y by causing pivotal motion of at least one of the second holding member 562 and the third holding member 563.

Configuration of Imaging Apparatus

Figure 8:
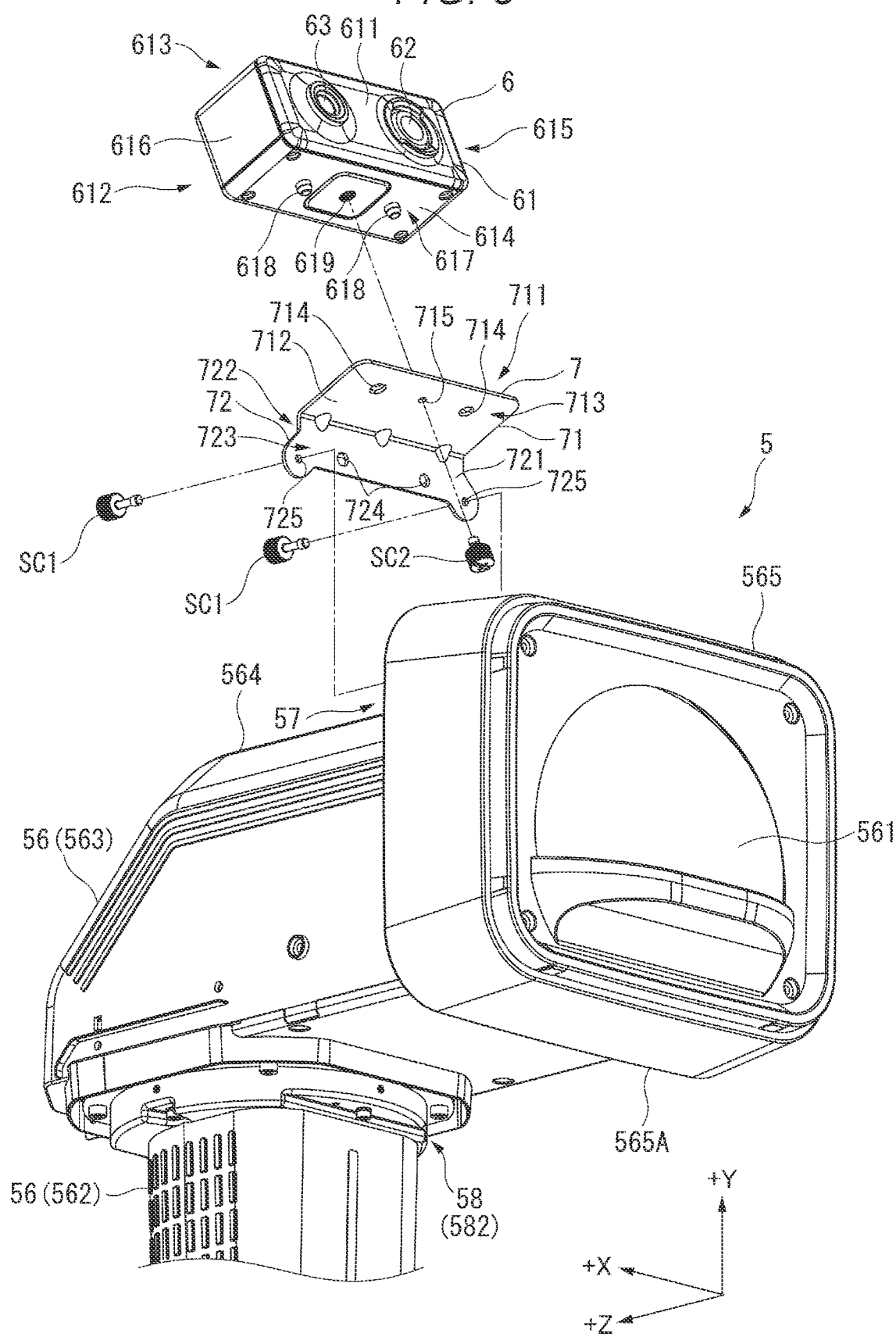
FIG. 8 is a perspective view showing the state in which the projection optical apparatus, the imaging apparatus, and the mounting member according to the embodiment are separate from each other.

FIG. 8 is a perspective view viewed in the direction −Z and showing the state in which the projection optical apparatus 5, the imaging apparatus 6, and the mounting member 7 are separate from each other.

The imaging apparatus 6 is coupled to the connection terminal provided at the outer surface of the exterior enclosure 2 via a cable. The imaging apparatus 6 captures an image of the area where the image light projected by the projection optical apparatus 5 is projected. The imaging apparatus 6 includes an enclosure 61, a first imager 62, and a second imager 63, as shown in FIGS. 7 and 8.

The enclosure 61 forms the exterior appearance of the imaging apparatus 6 and accommodates the first imager 62 and the second imager 63. The exterior enclosure 61 has a top surface 611, a rear surface 612, a top surface 613, a bottom surface 614, a left side surface 615, and a right side surface 616 and is formed in a substantially box-like shape.

When the imaging apparatus 6 is mounted on the projection optical apparatus 5 via the mounting member 7 and the projection part 565 faces in the direction −Z, the front surface 611 is a surface facing in the direction −Z, the rear surface 612 is a surface facing in the direction +Z, the top surface 613 is a surface facing in the direction +Y, and the bottom surface 614 is a surface facing in the direction −Y. The left side surface 615 is a surface facing in the direction +X, and the right side surface 616 is a surface facing in the direction −X.

The front surface 611 exposes the first imager 62 and the second imager 63.

The left side surface 615 is provided with a terminal 6151, into which the cable coupled to the connection terminal of the exterior enclosure 2 is inserted.

The bottom surface 614 is provided with a fixing part 617, as shown in FIG. 8. That is, the imaging apparatus 6 includes the fixing part 617.

The fixing part 617 fixes the imaging apparatus 6 to the mounting member 7. The fixing part 617 includes positioners 618 and a hole 619.

The positioners 618 position the imaging apparatus 6 at the mounting member 7. In the present embodiment, the fixing part 617 includes two positioners 618, which are inserted into positioners 714 provided at the mounting member 7. That is, the positioners 618 are positioning pins that are inserted into the positioners 714 of the mounting member 7 to position the imaging apparatus 6 at the mounting member 7.

The hole 619 is a hole into which a fixing member that fixes the imaging apparatus 6 to the mounting member 7 is inserted. In the present embodiment, the hole 619 is provided between the two positioners 618. The hole 619 is a screw hole into which a screw SC2 as the fixing member is inserted and fixed. When the imaging apparatus 6 is fixed to the mounting member 7, the bottom surface 614 and a first surface 711 of the mounting member 7 come into surface contact with each other. It can be said that the screw SC2 is a fixing member for the imaging apparatus.

The first imager 62 and the second imager 63 each capture an image of the area where the image light is projected by the projection optical apparatus 5 and output the captured image to the controller 3. The angle of view of the first imager 62 is greater than the angle of view of the second imager 63. That is, the imaging area of the first imager 62 on the projection receiving surface provided at a predetermined distance from the imaging apparatus 6 is greater than the imaging area of the second imager 63 on the projection receiving surface. In the present embodiment, the angle of view of the first imager 62 viewed in the direction +X is 169°.

The imaging apparatus 6 may be configured to include one of the first imager 62 and the second imager 63.

Configuration of Mounting Member

Figure 9:
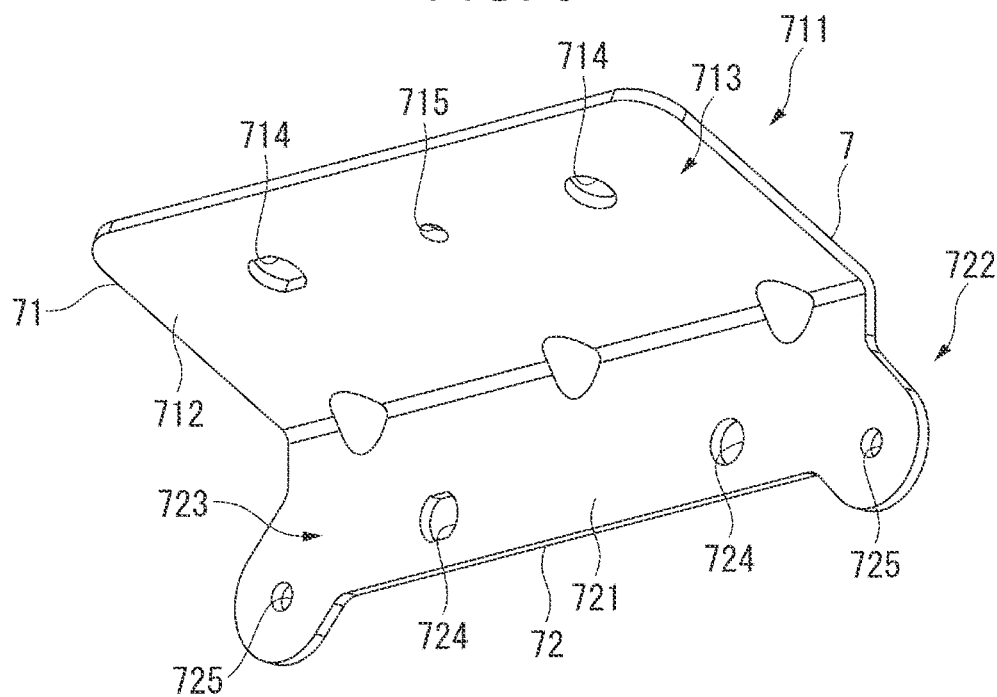
FIG. 9 is a perspective view showing the mounting member according to the embodiment.
Figure 10:
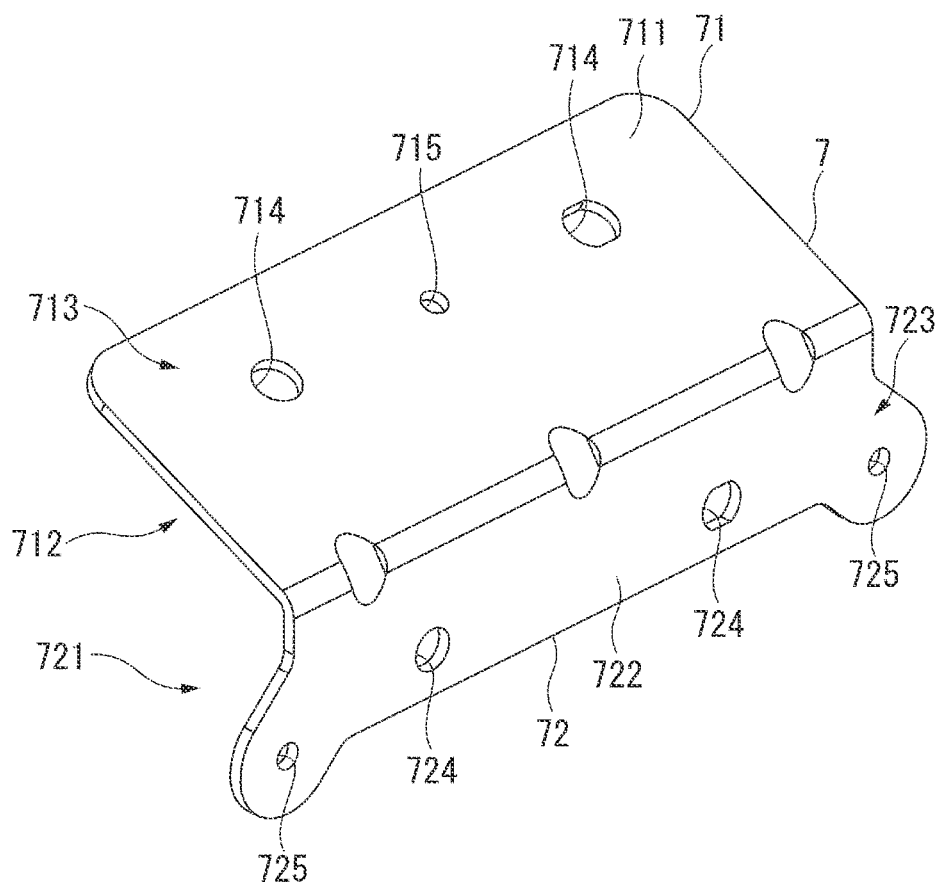
FIG. 10 is a perspective view showing the mounting member according to the embodiment.
Figure 10:
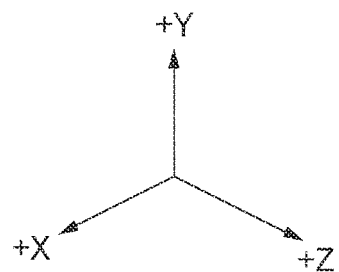

FIG. 9 is a perspective view of the mounting member 7 viewed in the direction −Z, and FIG. 10 is a perspective view of the mounting member 7 viewed in the direction +Z.

The mounting member 7 is a member that is fixed to the fixing part 57 of the projection optical apparatus 5 and mounts the imaging apparatus 6 on the projection optical apparatus 5. The mounting member 7 is formed, for example, by bending a sheet metal. The mounting member 7 includes a first plate part 71 and a second plate part 72, as shown in FIGS. 9 and 10.

The first plate part 71 has the shape of a planar plate and is a portion to which the imaging apparatus 6 is fixed. The first plate part 71 has a first surface 711 facing in the direction +Y, a second surface 712 opposite from the first surface 711 and facing in the direction −Y, and a fixing part 713.

The first surface 711 and the second surface 712 are surfaces on the opposite sides of the first plate part 71 and are substantially parallel to each other. That is, the first plate part 71 has a substantially uniform thickness.

The first surface 711 is a placement surface where the imaging apparatus 6 is placed.

The second surface 712 faces the projection part 565 when the mounting member 7 is fixed to the fixing part 57.

The fixing part 713 is a portion that fixes the imaging apparatus 6 to the first plate part 71. The fixing part 713 has the positioners 714 and a hole 715.

The positioners 714 correspond to an imaging apparatus positioner. The positioners 714 position the imaging apparatus 6. In the present embodiment, the fixing part 713 includes two positioners 714, and the positioners 618 provided at the imaging apparatus 6 are inserted into the positioners 714. That is, the positioners 714 are positioning holes into which the positioners 618 are inserted to position the imaging apparatus 6 at the mounting member 7.

The hole 715 corresponds to an imaging apparatus fixing hole. The hole 715 is a hole into which the fixing member that fixes the imaging apparatus 6 to the mounting member 7 is inserted. In the present embodiment, the hole 715 is provided between the two positioners 714. The screw SC2 as the fixing member screwed into the hole 619 of the imaging apparatus 6 is inserted into the hole 715. When the imaging apparatus 6 is fixed to the mounting member 7, the bottom surface 614 of the mounting member 7 and the first surface 711, which are placement surface, come into surface contact with each other.

When the mounting member 7 is attached to the fixing part 57, the −Z-direction end of the first plate part 71 is located in a position shifted in the direction +Z from the −Z-direction end of the projection lens 531, as shown in FIG. 3. That is, an end of the first plate part 71 that is the end on the side toward which the image light is projected via the projection lens 531 is shifted in the direction opposite to the image projection direction from an end of the projection lens 531 that is the end via which the image is projected. A situation in which part of the first plate part 71 falls within the range over which the projection lens 531 projects the image light is thus suppressed. That is, a situation in which the first plate part 71 blocks at least part of the image projected via the projection lens 531 is suppressed.

The second plate part 72 has the shape of a planar plate and is a portion fixed to the fixing part 57 of the projection optical apparatus 5. The second plate part 72 is provided on the side facing the second surface 712 of the first plate part 71. In detail, the second plate part 72 extends in the direction −Y from the +Z-direction end of the second surface 712 of the first plate part 71. The second plate part 72 has the first surface 721, a second surface 722, and a fixing part 723.

The first surface 721 and the second surface 722 are surfaces on the opposite sides of the second plate part 72 and are substantially parallel to each other. That is, the second plate part 72 has a substantially uniform thickness.

When the mounting member 7 is fixed to the fixing part 57, the first surface 721 faces in the direction −Z and comes into surface contact with the fixing surface 565A. At this point, the second surface 722 faces in the direction +Z.

The fixing part 723 is a portion that fixes the mounting member 7 to the fixing part 57. The fixing part 723 has positioners 724 and holes 725.

The positioners 724 correspond to a projection optical apparatus positioner. The positioners 724 position the mounting member 7 at the fixing part 57. That is, the positioners 724 position the projection optical apparatus 5. In the present embodiment, the fixing part 723 includes two positioners 724, and the positioners 571 provided at the fixing part 57 of the projection optical apparatus 5 are inserted into the positioners 724. That is, the positioners 724 are positioning holes into which the positioners 571 are inserted to position the mounting member 7 at the fixing part 57.

The holes 725 correspond to a projection optical apparatus fixing hole. The holes 725 are holes into which the fixing members that fix the mounting member 7 to the fixing part 57 are inserted. In the present embodiment, the fixing part 723 has two holes 725. The holes 725 are holes through which the screws SC1 as the fixing members to be fixed to the holes 572 of the projection optical apparatus 5 are inserted. When the mounting member 7 is fixed to the fixing part 57, the first surface 721 and the fixing surface 565A come into surface contact with each other.

Figure 11:
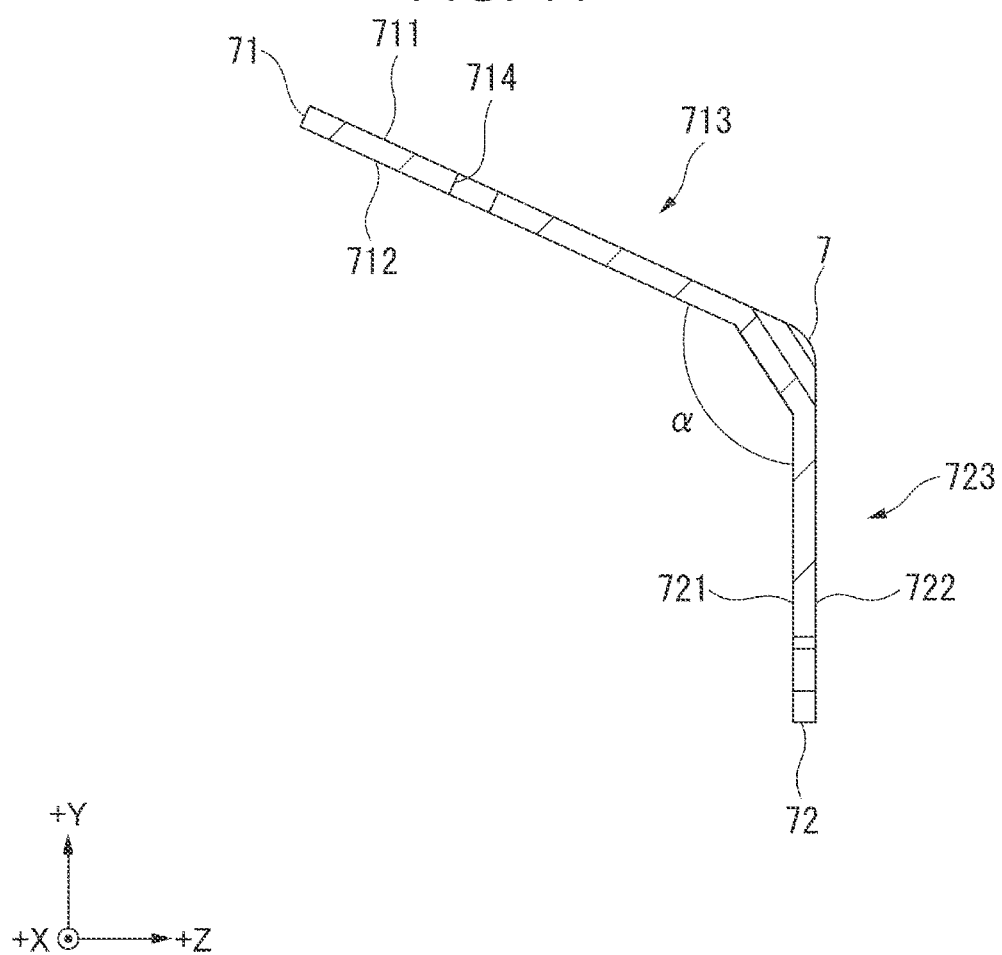
FIG. 11 is a cross-sectional view showing the mounting member according to the embodiment.

FIG. 11 shows the cross-section of the mounting member 7 taken along the plane YZ.

The first plate part 71 and the second plate part 72 intersect with each other, and an angle α between the first plate part 71 and the second plate part 72 is an obtuse angle, as shown in FIG. 11. In the present embodiment, the angle α between the first plate part 71 and the second plate part 72 is about 114°.

The first plate part 71, to which the imaging apparatus 6 is fixed, thus inclines at an obtuse angle with respect to the second plate part 72 fixed to the projection optical apparatus 5. Mounting the imaging apparatus 6 on the projection optical apparatus 5 via the mounting member 7 therefore allows the imaging apparatus 6 to be so disposed that the first imager 62 or the second imager 63 can capture an image of the area where the image light is projected by the projection optical apparatus 5.

That is, mounting the imaging apparatus 6 on the projection optical apparatus 5 via the mounting member 7 allows an image projected by the projection optical apparatus 5 to readily fall within the imaging range of the imaging apparatus 6. The controller 3 can then appropriately perform adjustment, such as the keystone correction and the color adjustment.

Effects of Embodiment

The projection optical apparatus 5 and the mounting member 7 according to the present embodiment described above provide the effects below.

The mounting member 7 mounts the imaging apparatus 6 on the projection optical apparatus 5, which projects the image light. The mounting member 7 includes the first plate part 71, which has the shape of a planar plate and to which the imaging apparatus 6 is fixed, and the second plate part 72, which has the shape of a planar plate, extends from the first plate part 71, and is fixed to the projection optical apparatus 5. The first plate part 71 has the first surface 711 and the second surface 712 opposite from the first surface 711. The second plate part 72 is disposed on the side facing the second surface 712. The first surface 711 is the placement surface where the imaging apparatus 6 is placed.

According to the configuration described above, in which the imaging apparatus 6 is provided at the projection optical apparatus 5 via the mounting member 7, even when the projection optical apparatus 5 is replaced in the projector 1, the imaging apparatus 6 can be disposed in a position where the imaging apparatus 6 readily captures an image of an image displayed when the projection optical apparatus 5 projects the image light. Similarly, even when the direction in which the projection optical apparatus 5 projects the image light is changed, the imaging apparatus 6 can be disposed in a position where the imaging apparatus 6 readily captures an image of the displayed image because the imaging apparatus 6 is provided at the projection optical apparatus 5.

The placement surface of the first plate part 71, which is the surface where the imaging apparatus 6 is placed, is the first surface 711 opposite from the second surface 712, where the second plate part 72 fixed to the projection optical apparatus 5 is provided. The imaging apparatus 6 and the projection optical apparatus 5 are thus unlikely to interfere with each other, whereby the imaging apparatus 6 can be readily mounted on the mounting member 7. The imaging apparatus 6 can therefore be readily mounted on the projection optical apparatus 5. The configuration in which the imaging apparatus 6 does not interfere with the projection optical apparatus 5 suppresses a situation in which the image light projected from the projection optical apparatus 5 is blocked by the imaging apparatus 6 and the mounting member 7.

The angle between the first plate part 71 and the second plate part 72 of the mounting member 7 is an obtuse angle.

According to the configuration described above, when the second plate part 72 is fixed to the projection optical apparatus 5, the first plate part 71 is separated away from the projection optical apparatus 5 as the first plate part 71 extends toward the side opposite from the second plate part 72. Fixing the imaging apparatus 6 to the first surface 711 of the first plate part 71, which is the surface opposite from the second surface 712, which faces the second plate part 72, allows the imaging apparatus 6 to be readily fixed to the mounting member 7 and also allows the imaging apparatus 6 to be readily disposed in a position where the imaging apparatus 6 readily captures an image of an image projected by the projection optical apparatus 5.

The second plate part 72 of the mounting member 7 includes the positioners 724, which position the projection optical apparatus 5, and the holes 725, into which the screws SC1, which fix the mounting member 7 to the projection optical apparatus 5, are inserted. The positioners 724 correspond to the projection optical apparatus positioner, the holes 725 correspond to the projection optical apparatus fixing holes, and the screws SC1 correspond to the fixing member.

The configuration described above allows the second plate part 72 to be precisely fixed to the projection optical apparatus 5 and allows in turn the imaging apparatus 6 to be precisely mounted on the projection optical apparatus 5. The imaging apparatus 6 can therefore be easily mounted in a position where the imaging apparatus 6 can capture a projected image.

The first plate part 71 of the mounting member 7 includes the positioners 714, which position the imaging apparatus 6, and the hole 715, into which the screw SC2, which fixes the imaging apparatus 6 to the mounting member 7, is inserted. The positioners 714 correspond to the imaging apparatus positioner, the hole 715 corresponds to the imaging apparatus fixing hole, and the screw SC2 corresponds to the fixing member.

The configuration described above allows the imaging apparatus 6 to be precisely fixed to the first plate part 71 and allows in turn the imaging apparatus 6 to be precisely mounted on the projection optical apparatus 5. The imaging apparatus 6 can therefore be easily mounted in a position where the imaging apparatus 6 can capture a projected image.

The projection optical apparatus 5 projects the image light. The projection optical apparatus 5 includes the fixing part 57, which fixes the mounting member 7, which mounts the imaging apparatus 6, which captures an image of the area where the image light is projected by the projection optical apparatus 5 is projected, on the projection optical apparatus 5.

According to the configuration described above, the imaging apparatus 6 can be readily mounted on the projection optical apparatus 5 via the mounting member 7. Therefore, even when the projection optical apparatus 5 is replaced, the imaging apparatus 6 can be mounted on the replaced projection optical apparatus 5. Furthermore, even when the direction in which the image is projected by the projection optical apparatus 5 is changed, the imaging apparatus 6 can be readily disposed in a position where the imaging apparatus 6 can capture the image.

In the projection optical apparatus 5, the fixing part 57 includes the positioners 571, which position the mounting member 7, and the holes 572, into which the screws SC1, which fix the mounting member 7 to the projection optical apparatus 5, are inserted. The positioners 571 correspond to the projection-optical-apparatus-side positioner, the holes 572 correspond to the projection-optical-apparatus-side holes, and the screws SC1 correspond to the fixing member.

The configuration described above allows the mounting member 7 to be precisely fixed to the projection optical apparatus 5 and allows in turn the imaging apparatus 6 to be precisely mounted on the projection optical apparatus 5. The imaging apparatus 6 can therefore be easily mounted in a position where the imaging apparatus 6 can capture a projected image.

The projection optical apparatus 5 includes the plurality of lenses including the projection lens 531 disposed in a position closest to the enlargement side, the lens barrel 56, which includes the projection part 565, which holds the projection lens 531 and projects the image light, and the projection direction changing mechanism 58, which changes the direction in which the image light projected by the projection part 565 is projected. The fixing part 57 is provided at the projection part 565.

According to the configuration described above, even when the direction in which the image is projected by the projection part 565 is changed by the projection direction changing mechanism 58, the direction in which the imaging apparatus 6 performs the imaging can be readily aligned with the direction in which the image light is projected. The imaging apparatus 6 can therefore readily capture the projected image.

The projection optical apparatus 5 includes the plurality of lenses, including the projection lens 531 disposed in a position closest to the enlargement side, and the lens barrel 56, which holds the plurality of lenses. The lens barrel 56 includes the projection part 565, which extends outward from the lens barrel 56 and holds the projection lens 531. The fixing part 57 is provided at the projection part 565.

The configuration described above allows the imaging apparatus 6, which is fixed to the projection part 565 via the mounting member 7, to readily capture an image of an image projected via the projection lens 531 held by the projection part 565.

In the projection optical apparatus 5, the projection part 565 has the fixing surface 565A, which intersects with the optical axis of the projection lens 531 and faces in the direction −Z, which is opposite to the direction in which the image light is projected by the projection optical apparatus 5. The fixing part 57 is provided at the fixing surface 565A.

According to the configuration described above, the imaging apparatus 6 and the mounting member 7 can be readily disposed in positions where the imaging apparatus 6 or the mounting member 7 does not block an image projected from the projection optical apparatus 5.

Variations of Embodiment

The present disclosure is not limited to the embodiment described above, and variations, improvements, and other modifications to the extent that the advantage of the present disclosure is achieved fall within the scope of the present disclosure.

In the embodiment described above, the angle α between the first plate part 71 and the second plate part 72 is an obtuse angle, but not necessarily. The angle α between the first plate part 71 and the second plate part 72 may be 90° or an acute angle.

In the embodiment described above, the second plate part 72 of the mounting member 7 includes the positioners 724 as the projection optical apparatus positioner and the holes 725 as the projection optical apparatus fixing hole, but not necessarily. At least either the positioners 724 or the holes 725 may be omitted. The positioners 724 may not be positioning holes and may instead be positioning pins.

In the embodiment described above, the first plate part 71 of the mounting member 7 includes the positioners 714 as the imaging apparatus positioner and the hole 715 as the imaging apparatus fixing hole, but not necessarily. At least either the positioners 714 or the hole 715 may be omitted. The positioners 714 may not be positioning holes and may instead be positioning pins.

In the embodiment described above, the projection optical apparatus 5 includes the fixing part 57, which fixes the mounting member 7, and the fixing part 57 includes the positioners 571 as the projection-optical-apparatus-side positioner and the holes 572 as the projection-optical-apparatus-side hole, but not necessarily. At least either the positioners 571 or the holes 572 may be omitted. Further, the fixing part 57 may have another configuration.

In the embodiment described above, the projection optical apparatus 5 includes the projection direction change mechanism 58, but not necessarily. The projection direction changing mechanism 58 may be omitted or may have another configuration. Furthermore, in the embodiment described above, the fixing part 57 is provided at the projection part 565, which holds the projection lens 531. In detail, the fixing part 57 is provided at the projection part 565, specifically, the fixing surface 565A, which intersects with the optical axis of the projection lens 531 and faces in the direction opposite to the direction in which the image light is projected by the projection lens 531, but not necessarily. The fixing part 57 may be provided at another portion of the projection optical apparatus 5.

In the embodiment described above, the projection optical apparatus 5 includes the optical system in which the optical axis 51X is perpendicular to the optical axis 52X, the optical axis 52X is perpendicular to the optical axis 53X, and the optical axis 53X is parallel to the optical axis 51X, but not necessarily. In the projection optical apparatus 5, the optical axis 51X may intersect with the optical axis 52X at an angle other than the right angle. In the projection optical apparatus 5, the optical axis 52X may intersect with the optical axis 53X at an angle other than the right angle. In the projection optical apparatus 5, the optical axis 53X may not be parallel to the optical axis 51X. The projection optical apparatus 5 may instead include an optical system in which the optical axis of the projection optical apparatus 5 is not deflected but the optical axis of the projection optical apparatus 5 linearly extends. That is, the optical system of the projection optical apparatus 5 according to the present disclosure is not limited to the optical system in the embodiment described above.

In the embodiment described above, the projector 1 includes the three light modulators 453B, 453G, and 453R, but not necessarily. The present disclosure is also applicable to a projector including two or less or four or more light modulators.

In the embodiment described above, the optical components in the image generator 4 are arranged in the layout shown in FIG. 1, but not necessarily. The optical components in the image generator 4 may be arranged in other layouts, or the image generator 4 may include optical components other than those shown in FIG. 1.

In the embodiment described above, the light modulators 453 are each a transmissive liquid crystal panel having a light incident surface and a light exiting surface different from each other, but not necessarily. The light modulators 453 may each be a reflective liquid crystal panel having a surface that serves both as the light incident surface and the light exiting surface. Further, a light modulator using any component other than a liquid-crystal-based component and capable of modulating an incident light flux to form an image according to image information, such as a device using micromirrors, for example, a digital micromirror device (DMD), may be employed.

Overview of Present Disclosure

The present disclosure will be overviewed below as additional remarks.

A mounting member according to a first aspect of the present disclosure is a mounting member that mounts an imaging apparatus on a projection optical apparatus that projects image light, and the mounting member includes a first plate part which has the shape of a planar plate and to which the imaging apparatus is fixed and a second plate part that has the shape of a planar plate, extends from the first plate part, and is fixed to the projection optical apparatus, the first plate part having a first surface and a second surface opposite from the first surface, the second plate part being disposed on the side facing the second surface, the first surface being a placement surface where the imaging apparatus is placed.

According to the configuration described above, in which the imaging apparatus is provided at the projection optical apparatus via the mounting member, even when the projection optical apparatus is replaced in the projector, the imaging apparatus can be disposed in a position where the imaging apparatus readily captures an image of an image displayed when the projection optical apparatus projects the image light. Similarly, even when the direction in which the projection optical apparatus projects the image light is changed, the imaging apparatus can be disposed in a position where the imaging apparatus readily captures an image of the displayed image because the imaging apparatus is provided at the projection optical apparatus.

The placement surface of the first plate part, which is the surface where the imaging apparatus is placed, is the first surface opposite from the second surface, where the second plate part fixed to the projection optical apparatus is provided. The imaging apparatus and the projection optical apparatus are thus unlikely to interfere with each other, whereby the imaging apparatus can be readily mounted on the mounting member. The imaging apparatus can therefore be readily mounted on the projection optical apparatus. The configuration in which the imaging apparatus does not interfere with the projection optical apparatus suppresses the situation in which the image light projected from the projection optical apparatus is blocked by the imaging apparatus and the mounting member.

In the first aspect described above, the angle between the first plate part and the second plate part may be an obtuse angle.

According to the configuration described above, when the second plate part is fixed to the projection optical apparatus, the first plate part is separated away from the projection optical apparatus as the first plate part extends toward the side opposite from the second plate part. Fixing the imaging apparatus to the first surface of the first plate part, which is the surface opposite from the second surface, which faces the second plate part, allows the imaging apparatus to be readily fixed to the mounting member and also allows the imaging apparatus to be readily disposed in a position where the imaging apparatus readily captures an image of an image projected by the projection optical apparatus.

In the first aspect described above, the second plate part may include a projection optical apparatus positioner that positions the projection optical apparatus and a projection optical apparatus fixing hole into which a fixing member that fixes the mounting member to the projection optical apparatus is inserted.

The configuration described above allows the second plate part to be precisely fixed to the projection optical apparatus and allows in turn the imaging apparatus to be precisely mounted on the projection optical apparatus. The imaging apparatus can therefore be easily mounted in a position where the imaging apparatus can capture a projected image.

In the first aspect described above, the first plate part may include an imaging apparatus positioner that positions the imaging apparatus and an imaging apparatus fixing hole into which a fixing member that fixes the imaging apparatus to the mounting member is inserted.

The configuration described above allows the imaging apparatus to be precisely fixed to the first plate part and allows in turn the imaging apparatus to be precisely mounted on the projection optical apparatus. The imaging apparatus can therefore be easily mounted in a position where the imaging apparatus can capture a projected image.

The projection optical apparatus according to a second aspect of the present disclosure is a projection optical apparatus that projects image light and includes a fixing part that fixes a mounting member that mounts on the projection optical apparatus an imaging apparatus that captures an image of the area where the image light is projected by the projection optical apparatus is projected.

According to the configuration described above, the imaging apparatus can be readily mounted on the projection optical apparatus via the mounting member. Therefore, even when the projection optical apparatus is replaced, the imaging apparatus can be mounted on the replaced projection optical apparatus. Furthermore, even when the direction in which the image is projected by the projection optical apparatus is changed, the imaging apparatus can be readily disposed in a position where the imaging apparatus can capture the image.

In the second aspect described above, the fixing part includes a projection-optical-apparatus-side positioner that positions the mounting member and a projection-optical-apparatus-side hole into which a fixing member that fixes the mounting member to the projection optical apparatus is inserted.

The configuration described above allows the mounting member to be precisely fixed to the projection optical apparatus and allows in turn the imaging apparatus to be precisely mounted on the projection optical apparatus. The imaging apparatus can therefore be easily mounted in a position where the imaging apparatus can capture a projected image.

In the second aspect described above, the projection optical apparatus may include a plurality of lenses including a projection lens disposed in a position closest to the enlargement side, a lens barrel that includes a projection part that holds the projection lens and projects the image light, and a projection direction changing mechanism that changes the direction in which the image light projected from the projection part is projected, and the fixing part may be provided at the projection part.

According to the configuration described above, even when the direction in which the image is projected by the projection part is changed by the projection direction changing mechanism, the direction in which the imaging apparatus performs the imaging can be readily aligned with the direction in which the image light is projected. The imaging apparatus can therefore readily capture the projected image.

In the second aspect described above, the projection optical apparatus may include a plurality of lenses including a projection lens disposed in a position closest to the enlargement side and a lens barrel that holds the plurality of lenses. The lens barrel may include a projection part that extends outward from the lens barrel and holds the projection lens. The fixing part may be provided at the projection part.

The configuration described above allows the imaging apparatus, which is fixed to the projection part via the mounting member, to readily capture an image of an image projected via the projection lens held by the projection part.

In the second aspect described above, the projection part may have a fixing surface that intersects with the optical axis of the projection lens and faces in the direction opposite to the direction in which the image light is projected by the projection optical apparatus, and the fixing part may be provided at the fixing surface.

According to the configuration described above, the imaging apparatus and the mounting member can be readily disposed in positions where the imaging apparatus or the mounting member does not block an image projected from the projection optical apparatus.

What is claimed is:

1. A mounting member that mounts an imaging apparatus on a projection optical apparatus that projects image light, the mounting member comprising:
    a first plate to which the imaging apparatus is fixed, the first plate having a shape of a planar plate; and
    a second plate having a shape of a planar plate and extending from the first plate, the second plate being fixed to the projection optical apparatus,
    wherein the first plate has a first surface and a second surface opposite from the first surface,
    the second plate is disposed on a side facing the second surface,
    the first surface is a placement surface where the imaging apparatus is placed, and
    the first plate includes
        an imaging apparatus positioner configured to position the imaging apparatus, and
        an imaging apparatus defining a fixing hole into which a fixing insert fastener fixing the imaging apparatus to the mounting member is inserted.

2. The mounting member according to claim 1, wherein an angle between the first plate and the second plate is an obtuse angle.

3. The mounting member according to claim 1, wherein the second plate includes
    a projection optical apparatus positioner configured to position the projection optical apparatus, and
    a projection optical apparatus defining a fixing hole into which a fixing insert fastener fixing the mounting member to the projection optical apparatus is inserted.

4. A projection optical apparatus that projects image light, the projection optical apparatus comprising
    a fixing support frame fixing a mounting member that mounts an imaging apparatus on the projection optical apparatus, the imaging apparatus being configured to capture an image of a projection area where the image light is projected by the projection optical apparatus,
    wherein the fixing support frame includes
        a projection-optical-apparatus-side positioner configured to position the mounting member, and
        a projection-optical-apparatus-side hole into which a fixing insert fastener fixing the mounting member to the projection optical apparatus is inserted.

5. The projection optical apparatus according to claim 4, further comprising:
    a plurality of lenses including a projection lens disposed in a position closest to an enlargement side;
    a lens barrel including a projection lens mount that holds the projection lens and projects the image light, and
    a projection direction changing mechanism configured to change a projection direction in which the image light is projected from the projection lens mount,
    wherein the fixing support frame is provided at the projection lens mount.

6. The projection optical apparatus according to claim 5, wherein the projection lens mount has a fixing surface intersecting with an optical axis of the projection lens and facing in a direction opposite to the projection direction, and
    the fixing support frame is provided at the fixing surface.

7. The projection optical apparatus according to claim 4, further comprising:
    a plurality of lenses including a projection lens disposed in a position closest to an enlargement side, and
    a lens barrel holding the plurality of lenses,
    wherein the lens barrel includes a projection lens mount extending outward from the lens barrel and holding the projection lens, and
    the fixing support frame is provided at the projection lens mount.

8. A projector comprising:
    a light modulator modulating light emitted from a light source; and
    the projection optical apparatus according to claim 5 that projects the light modulated by the light modulator.

9. A mounting member that mounts an imaging apparatus on a projection optical apparatus that projects image light, the mounting member comprising:
    a first plate to which the imaging apparatus is fixed, the first plate having a shape of a planar plate; and a second plate having a shape of a planar plate and extending from the first plate, the second plate being fixed to the projection optical apparatus, wherein the first plate has a first surface and a second surface opposite from the first surface, the second plate is disposed on a side facing the second surface, the first surface is a placement surface where the imaging apparatus is placed, and the second plate includes
- a projection optical apparatus positioner configured to position the projection optical apparatus, and
- a projection optical apparatus defining a fixing hole into which a fixing insert fastener fixing the mounting member to the projection optical apparatus is inserted.

10. The mounting member according to claim 9, wherein an angle between the first plate and the second plate is an obtuse angle.

11. The mounting member according to claim 9, wherein the first plate includes
- an imaging apparatus positioner configured to position the imaging apparatus, and
- an imaging apparatus defining a fixing hole into which a fixing insert fastener fixing the imaging apparatus to the mounting member is inserted.

* * * * *